(No Model.)
P. HENGER.
SURGICAL INSTRUMENT.
No. 474,130. Patented May 3, 1892.
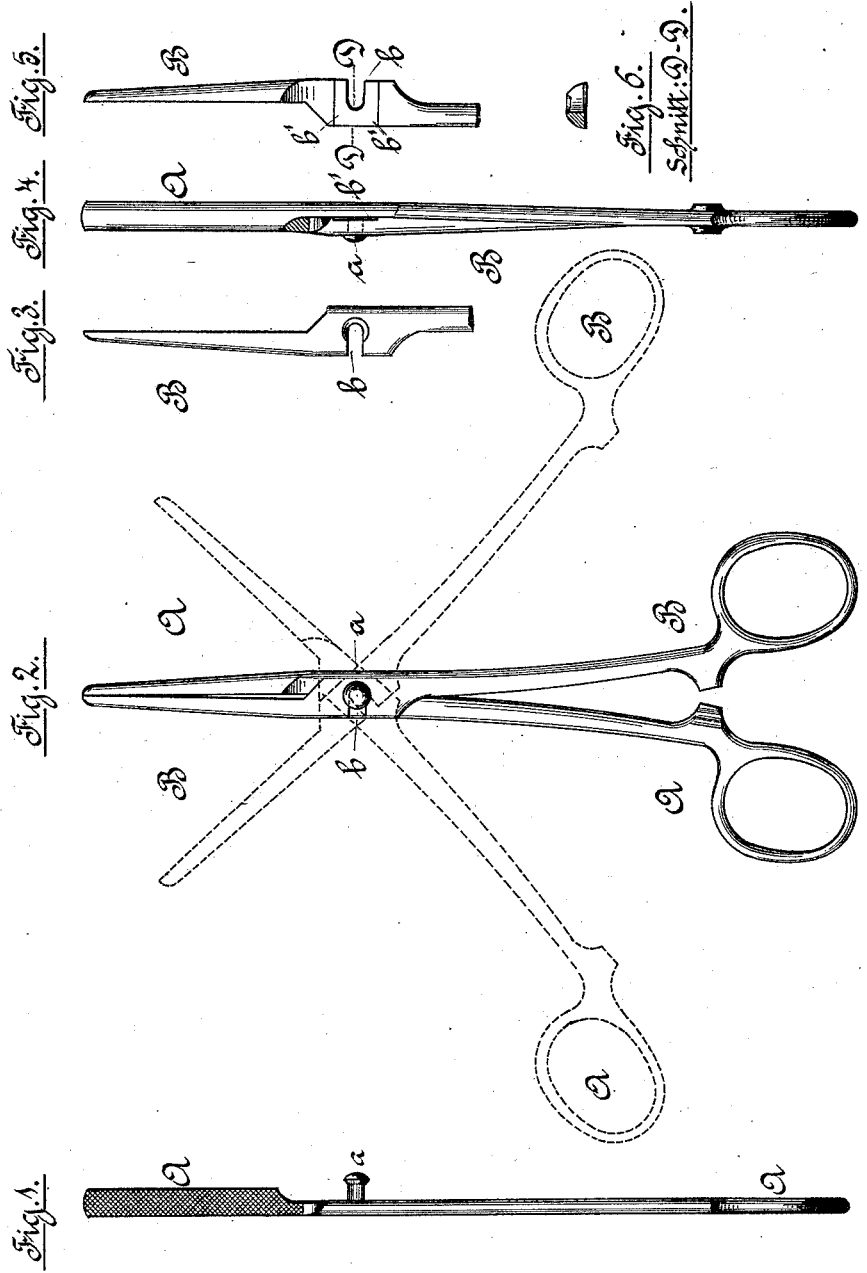
Witnesses:
M. A. M. Frayser.
C. J. Hzduck.
Inventor:
Paul Henger
by Max Henger
his Attorney

UNITED STATES PATENT OFFICE.

PAUL HENGER, OF STUTTGART, GERMANY.

SURGICAL INSTRUMENT.

SPECIFICATION forming part of Letters Patent No. 474,130, dated May 3, 1892.

Application filed December 10, 1891. Serial No. 414,602. (No model.) Patented in Germany March 7, 1891, No. 59,030, and in England May 29, 1891, No. 9,117.

*To all whom it may concern:*

Be it known that I, PAUL HENGER, a citizen of the Kingdom of Würtemberg, residing at Stuttgart, Würtemberg, Germany, have invented a new and useful Improvement in Separable Jaw-Tools, (for which I have obtained patents in Germany March 7, 1891, No. 59,030, and in England May 29, 1891, No. 9,117,) of which the following is a specification.

My present invention is designed to adapt jaw-tools—such as forceps, shears, and the like instruments, and especially such as are used in surgical operations—to be taken apart and reunited in the simplest manner for the purpose of permitting a thorough cleaning and sharpening of the parts detached from each other.

In the drawings, Figures 1 to 6, a simple pair of forceps is represented, which serves to illustrate the essence of my invention.

In the drawings, Fig. 1 represents an inner elevation of one of the legs of the forceps; Fig. 2, a plan of the said forceps in locked position, showing the separable position in dotted lines; Figs. 3 and 5, an outer and inner plan, respectively, of one of the jaws; Fig. 4, a side elevation of the forceps; Fig. 6, a transverse section on line D D, Fig. 5.

The two legs A and B of the forceps are not held together in the usual way by a screw-bolt; but one of the legs A is provided with a fixed pin $a$, whose free end is headed in the manner of a rivet and bolt, as shown. The other leg B is provided with an open slot or notch $b$, whereby the said leg B may be slipped under the pin $a$ of the leg A.

In order that the two legs of the forceps may be separated only in a determined position, (in dotted lines in Fig. 2,) the leg B, having the slot or notch B, is provided on its inner side with a transverse mortise $b'$, having the width of the leg A, while the slot $b$ is provided with a countersunk portion, preferably in the shape of a conical enlargement on the outer side, as shown. By this arrangement, after the two legs A and B have been united in the position indicated in dotted lines in Fig. 2, the rivet-head of the pin $a$ is pressed into the upper conical enlargement of the open slot $b$ upon closing the forceps. The falling apart or separation of the legs of the forceps is thereby prevented so long as the position of the legs indicated in dotted lines in Fig. 2 has not been attained.

While I have shown in the drawings and described my invention as applied to surgical forceps, it is manifest that the same may be applied to other jaw-tools for surgical and other purposes, such as shears, tongs, pliers, and the like, and I desire it to be understood that my invention covers all such tools and instruments.

What I claim, and desire to secure by Letters Patent therefor, is—

1. In surgical instruments and similar tools, a leg provided with an open slot, provided with a countersunk portion, in combination with a second leg provided with a pin for engaging said slot, having a head for engaging the countersunk portion of the slot, substantially as described.

2. In surgical instruments and similar tools, a leg provided with a slot having an outer conical enlargement and also provided with a transverse mortise on its inner surface, in combination with a second leg provided with a headed pin for engaging said slot, substantially as described.

In testimony whereof I have signed this specification in the presence of two subscribing witnesses.

PAUL HENGER.

Witnesses:
AUGUST B. DRANTZ,
CARL DUSSMANNTZ.